(12) United States Patent
Niwa

(10) Patent No.: US 10,782,169 B2
(45) Date of Patent: Sep. 22, 2020

(54) ULTRASONIC FLOWMETER

(71) Applicant: Rohm Co., Ltd., Kyoto (JP)

(72) Inventor: Isao Niwa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 194 days.

(21) Appl. No.: 16/123,036

(22) Filed: Sep. 6, 2018

(65) Prior Publication Data

US 2019/0078919 A1   Mar. 14, 2019

(30) Foreign Application Priority Data

Sep. 8, 2017 (JP) ................................. 2017-172786

(51) Int. Cl.
*G01F 1/66* (2006.01)
*H03F 3/45* (2006.01)

(52) U.S. Cl.
CPC .............. *G01F 1/668* (2013.01); *G01F 1/667* (2013.01)

(58) Field of Classification Search
CPC ..................... G01F 1/66; H03F 3/45
See application file for complete search history.

(56) References Cited

U.S. PATENT DOCUMENTS

| 5,503,035 A * | 4/1996 | Itoh ....................... G01F 1/3209 |
| | | 73/861.19 |
| 8,578,787 B1 * | 11/2013 | Feller ....................... G01F 1/32 |
| | | 73/861.23 |
| 2019/0049277 A1 * | 2/2019 | Niwa ..................... G01F 1/662 |

FOREIGN PATENT DOCUMENTS

| JP | 2866332 B2 | 12/1998 |
| JP | 4973035 B2 | 4/2012 |

* cited by examiner

*Primary Examiner* — Jewel V Dowtin
(74) *Attorney, Agent, or Firm* — Fish & Richardson P.C.

(57) ABSTRACT

An ultrasonic flowmeter has oscillators 1, 2, a transmitter 31 for transmitting burst waves BURST, amplifiers 34, 35 for amplifying a received signal, a first comparator 36 for checking whether the crest of the amplified signal falls within a predetermined range, a second comparator 37 for checking whether the amplified signal exceeds a predetermined threshold, a third comparator 38 for detecting zero-cross points in the amplified signal, and a controller 40 including a time counter for measuring the propagation time from when the burst waves are transmitted until when the amplified signal reaches a zero-cross point. The time counter has a low-speed clock, a mid-speed clock whose frequency is calibrated with the low-speed clock and whose propagation time is shorter than that of the low-speed clock, and a high-speed clock whose frequency is calibrated with the mid-speed clock and whose propagation time is shorter than that of the mid-speed clock.

17 Claims, 8 Drawing Sheets

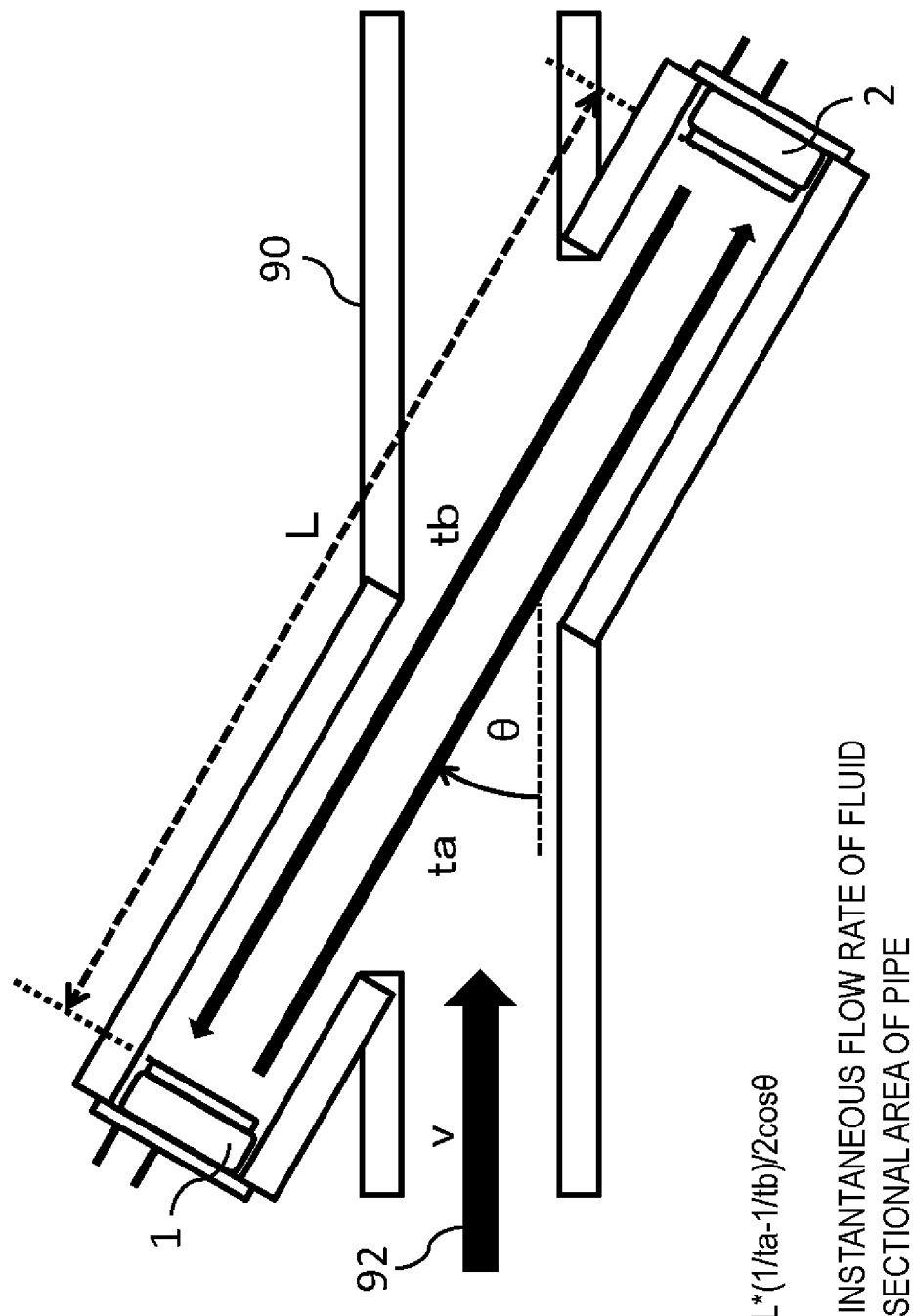

ULTRASONIC FLOWMETER

CROSS-REFERENCE TO RELATED APPLICATIONS

This application is based on Japanese Patent Application No. 2017-172786 filed on Sep. 8, 2017, the contents of which are hereby incorporated by reference.

BACKGROUND OF THE INVENTION

1. Field of the Invention

The present invention relates to ultrasonic flowmeters which measure the flow velocity and the flow rate of a flowing fluid based on the propagation time of an ultrasonic signal.

2. Description of Related Art

There has been proposed an ultrasonic flowmeter that employs what is called a sing-around method which achieves improved measurement resolution by repeating transmission and reception of signals between two oscillators.

Japanese Patent No. 2866332 (hereinafter, Patent Document 1) discloses an ultrasonic flowmeter employing the sing-around method. Patent Document 1 discloses the following method for measuring the flow velocity of a flowing fluid: A reference clock and a second reference clock with a longer period than the reference clock are used. The two clocks are compared with each other intermittently at regular time intervals to find the deviation of the reference clock from the second reference clock. Based on the thus found deviation, a count value of a counter that counts the time between a transmission command signal and a reception wave signal is corrected. The reference clock is generated by using a ceramic oscillator or a CR oscillator, and the second reference clock is generated by using a crystal oscillator.

Japanese Patent No. 4973035 (hereinafter, Patent Document 2) discloses an ultrasonic flowmeter similar to that disclosed in Patent Document 1 in that it also employs the sing-around method.

FIG. 8 of the present application is a diagram drawn by the applicant of the present application to illustrate a fluid pipe and two oscillators around the fluid pipe as part of the ultrasonic flowmeter employing the sing-around method disclosed in Patent Document 2.

In FIG. 8, a first oscillator 1 and a second oscillator 2 are disposed at a fluid pipe 90 to be opposite to each other, at a predetermined angle θ with respect to a fluid flow 92. The first oscillator 1 is disposed on the upstream side, and the second oscillator 2 is disposed on the downstream side, with respect to the fluid flow 92. The fluid flow 92 flows through the fluid pipe 90 at a flow velocity v.

With C representing the sonic velocity, and v representing the flow velocity, the propagation velocity of an ultrasonic wave traveling from upstream side to downstream side with respect to the fluid flow 92, that is, a forward ultrasonic wave, is represented by (C+v), and the velocity of an ultrasonic wave traveling from downstream side to upstream side, that is, a backward ultrasonic wave, is represented by (C−v). With L representing a distance between the two oscillators, and θ representing an angle formed by an ultrasonic wave propagation axis and the central axis of the fluid pipe 90, propagation times ta and tb in the forward direction and the backward direction, respectively, are represented by formula 1 and formula 2 below.

$ta = L/(C + v \cdot \cos\theta)$    formula 1

$tb = L/(C \cdot v \cdot \cos\theta)$    formula 2

From formula 1 and formula 2, the flow velocity v is can be represented by formula 3 below.

$v = L \cdot (1/ta - 1/tb)/2 \cos\theta$    formula 3

With S representing a sectional area of the fluid pipe 90, and K representing a correction coefficient, from formula 3, an instantaneous flow rate Q of the fluid is represented by formula 4 below.

$Q = v \cdot S \cdot K$    formula 4

Here, the difference between the propagation time ta and the propagation time tb is so very small that the difference is difficult to measure accurately. This is coped with by measuring the difference a large number of times and averaging measured values of the difference, and thereby the measurement error is made comparatively small and the resolution is enhanced. Specifically, the propagation in the forward direction and the propagation in the backward direction are each repeated n times, with Ta and Tb representing time taken for signal transmission and reception by the n times of repetition in the forward direction and in the backward direction, respectively, and by dividing Ta and Tb each by n, the propagation time ta and tb each in one propagation can be obtained, and by using these values, it is possible to obtain an accurate value of the instantaneous flow rate Q. These repeated measurements are performed intermittently with a constant period τ (2 seconds, for example), and a product of the instantaneous flow rate Q obtained by formula 4 and the intermittent period τ is calculated, whereby is obtained the flow rate of the fluid having passed through the fluid pipe 90 during the intermittent period τ. By adding up values of the flow rate obtained in this manner, it is possible to obtain the total value of the flow rate of the fluid.

Patent Document 2 indicates that a high-speed clock is generated by a CR oscillator circuit, a low-speed clock is generated by a crystal oscillator circuit, and an auxiliary clock is generated by a ring oscillator.

It is admitted that Patent Documents 1 and 2 disclose part of the technical idea of the present invention, which will be described later. Still, however, they do not disclose any specific circuit configurations for achieving the object of the present invention.

SUMMARY OF THE INVENTION

An object of the present invention is to propose a circuit configuration suitable to be used in an ultrasonic flowmeter to measure the propagation time of a fluid.

Herein, a "clock" indicates an oscillation signal generated by any of various oscillators. "Calibration" indicates measuring an actual frequency (period) of the clock based on a reference clock. Note that calibration of another clock by means of a new reference clock that is a clock having calibrated by means of the reference clock is also included in the "calibration" herein. A "calibration circuit" and a "calibration means" herein include not only a circuit function for performing the "calibration", but also a supplementary function for executing the circuit function.

According to an aspect of the present invention, an ultrasonic flowmeter includes a first oscillator and a second oscillator which are disposed at a fluid pipe in which a fluid flows, and which transmit and receive ultrasonic signals to and from each other, a transmitter which transmits burst waves to the first oscillator or to the second oscillator, a switch which switches the first oscillator and the second oscillator to either a transmission side or a reception side, an amplifier which amplifies a received signal generated by the first oscillator or by the second oscillator, a first comparator where a predetermined threshold is set, and which checks whether a crest of an amplified signal outputted from the amplifier falls within a predetermined range, a second comparator where a threshold that is smaller than the threshold of the first comparator is set, and which checks whether the amplified signal exceeds a predetermined threshold, a third comparator which detects a plurality of zero-cross points in the amplified signal, and a time counter which measures a propagation time from when the burst waves are transmitted until when the amplified signal reaches a zero-cross point of the plurality of zero-cross points. Here, the time counter is provided with a low-speed clock, a mid-speed clock whose frequency is calibrated with the mid-speed clock, and whose propagation time is shorter than a propagation time of the low-speed clock, and a high-speed clock whose frequency is calibrated with the mid-speed clock, and whose propagation time is shorter than the propagation time of the mid-speed clock, a first propagation time is measured by a first propagation time counter using the mid-speed clock, a second propagation time is measured by a second propagation time counter using the high-speed clock, and the propagation time is obtained from a difference between, or a sum of, the first propagation time and the second propagation time. Thereby, it is possible to reduce the operation time of the high-speed clock, during which a large amount of power is consumed, to a minimum necessary length.

Other features, constituent components, operational steps, advantages, and characteristics of the present invention will be further clarified by the following detailed descriptions of embodiments and accompanying drawings related thereto.

BRIEF DESCRIPTION OF THE DRAWINGS

FIG. 8 is a diagram of and around a fluid pipe of an ultrasonic flowmeter.

DETAILED DESCRIPTION OF PREFERRED EMBODIMENTS

Embodiment

Figure 1:
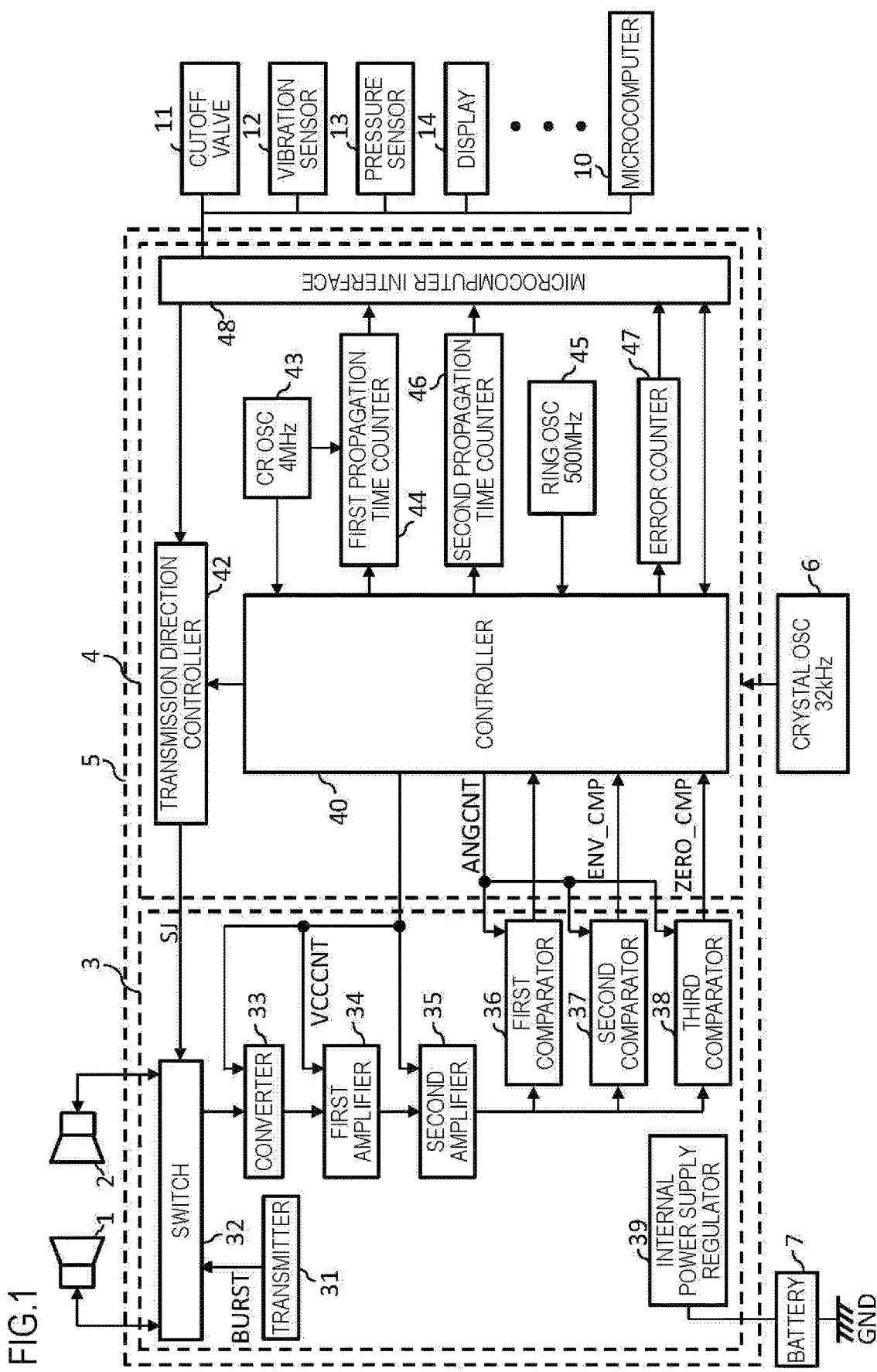
FIG. 1 is a circuit block diagram of an ultrasonic flowmeter according to an embodiment of the present invention.

FIG. 1 is a circuit block diagram of an ultrasonic flowmeter according to an embodiment of the present invention. In FIG. 1, the ultrasonic flowmeter according to one embodiment of the present invention includes a first oscillator 1 and a second oscillator 2, and these oscillators are disposed at a fluid pipe 90 to be opposite to each other (see FIG. 8). The ultrasonic flowmeter according to the present embodiment of the present invention further includes a semiconductor integrated circuit 5 including an analogue portion 3 and a logic portion 4, a first oscillation device 6, a battery 7, a cutoff valve 11, an oscillation sensor 12, a pressure sensor 13, a display 14, and a microcomputer 10, which are disposed outside the semiconductor integrated circuit 5, and so on. The first oscillation device 6 generates a clock with a frequency of, for example, 32 kHz (which is exactly 32.768 kHz). Herein, the clock generated by the first oscillation device 6 will be referred to as a "low-speed clock".

The analogue portion 3 includes a transmitter 31 which transmits burst waves BURST to the first oscillator 1 and to the second oscillator 2, a switch 32 which, on receiving a transmission-reception direction control signal SJ from the logic portion 4, switches a burst-waves-BURST transmission side between the first oscillator 1 and the second oscillator 2, and a converter 33 which converts the output forms of the oscillators. When the first oscillator 1 is the burst-waves-BURST transmission side, the second oscillator 2 is the burst-waves-BURST reception side, and when the second oscillator 2 is the burst-waves-BURST transmission side, the first oscillator 1 is the burst-waves-BURST reception side. The burst waves BURST are an intermittently-generated rectangular or sine wave signal or the like having a frequency of, for example, 520 kHz, and the number "N" of the burst waves BURST is appropriately set in accordance with the kind of the oscillators 1 and 2 and the kind of the ultrasonic flowmeter, and herein the number "N" is set to N=4 to 6. When the outputs of the oscillators are in the form of current, the converter 33 performs what is called the I/V conversion of converting current to voltage, and when the outputs of the oscillators are in the form of voltage, the converter 33 performs voltage-voltage conversion, that is, the V/V conversion, or the converter 33 may be dispensable.

The analogue portion 3 further includes a first amplifier 34 which amplifies the amplitude of a signal from the first oscillator 1 or from the second oscillator 2 to a predetermined magnitude, and a second amplifier 35 which performs fine adjustment of the signal having amplified by the first amplifier 34 to adjust the amplitude of the signal to a predetermined magnitude. If at least one of the first amplifier 34 and the second amplifier 35 is able to adjust the gain of the amplified signal, it is sufficient to provide either the first amplifier 34 or the second amplifier 35. Usable as the amplifiers is, for example, a programmable-gain amplifier (PGA) of which the gain is adjustable in 256 stages. Herein, a "received signal" is synonymous with the amplified signal extracted from the first amplifier 34 or the second amplifier 35.

The ultrasonic flowmeter further includes a first comparator 36 which checks whether the crest of the received signal (the output of the first amplifier 34 or of the second amplifier 35) is within a predetermined range, and a second comparator 37 which serves as what is called an envelope comparator, checking whether the received signal exceeds a predetermined threshold. The ultrasonic flowmeter still further includes a third comparator 38 which detects a plurality of zero-cross points in the received signal, and an internal power supply regulator 39 which stabilizes a voltage for driving the analogue portion 3 and the logic portion 4.

The logic portion 4 includes a controller 40, a transmission-reception direction controller 42, a second oscillation device 43, and a first propagation time counter 44 which counts a clock generated by the second oscillation device 43. The second oscillation device 43 is constituted of, for example, a CR oscillator using a resistor and a capacitor. Specifically, in the present invention, a CR oscillator, which generates a clock by charging and discharging a capacitor with a constant current, is adopted as the second oscillation device 43, and the frequency of 4 MHz, for example, is selected as the normal oscillation frequency of the second oscillation device 43. Here, the second oscillation device 43 may be, instead of a CR oscillator, an unillustrated ceramic oscillator disposed outside the semiconductor integrated circuit 5. Herein, the clock generated by the second oscillation device 43 is referred to as a "mid-speed clock". The logic portion 4 further includes a third oscillation device 45, and a second propagation time counter 46 which counts a clock generated by the third oscillation device 45. The third oscillation device 45 is constituted of a ring oscillator, for example, and the frequency of 500 MHz, for example, is selected as the frequency of the clock generated by the third oscillation device 45. Herein, the clock generated by the third oscillation device 45 is referred to as a "high-speed clock".

Thus, "the low-speed clock", "the mid-speed clock", and "the high-speed clock" are oscillation signals generated by the first oscillation device 6, the second oscillation device 43, and the third oscillation device 45, respectively. The high-speed clock has a propagation time shorter than that of the mid-speed clock, and the mid-speed clock has a propagation time shorter than that of the low-speed clock. In other words, the relationship between the frequencies of these clocks is represented by high-speed clock>mid-speed clock>low-speed clock.

The logic portion 4 further includes an error counter 47. The error counter 47 counts the number of errors occurring when the propagation time of a fluid is measured M times. Here, the following cases are each recognized as an error: a case where a received signal ER is larger than a predetermined threshold ER_H_Vth (a high error); a case where the received signal ER is smaller than a predetermined threshold ER_L_Vth (a low error); and a case where no detection is made despite passage of a predetermined time since transmission of burst waves (an overflow). In the present invention, in measuring propagation time, when measurements of from upstream side to downstream side and from downstream side to upstream side of the fluid pipe is one packet of measurement, 64 packets of measurements are performed, for example, and it is the role of the error counter 47 to count the number of errors occurring in the measurements. Here, the error counter 47 is not an indispensable component. In a case where, in the 64 packets of measurements, ten or more errors occur, for example, readjustment and resetting are to be performed by the first amplifier 34 and the second amplifier 35, of the analogue portion 3, for example. Here, this number of times is settable based on the level of accuracy required of the ultrasonic flowmeter. Without the error counter 47, the accuracy of flow measuring may be lowered.

The controller 40 constitutes the central part of the logic portion 4, and performs measurement of the propagation time of a fluid (such as gas), calibration of the mid-speed clock, calibration of the high-speed clock, and various controls of the analogue portion 3. Here, the logic portion 4 is further capable of digitally adjusting the gain of the analogue portion 3, specifically, of the first amplifier 34 and of the second amplifier 35, based on various signals inputted from the analogue portion 3, in first to 128th steps obtained by dividing up to 40 db (100 times) by 128. The specific internal circuit configuration of the controller 40 will be described later.

In the logic portion 4, a microcomputer interface 48 is prepared. The microcomputer interface 48 has a relay function of sending various data extracted from each of the transmission-reception direction controller 42, the first propagation time counter 44, the second propagation time counter 46, and the error counter 47 to the microcomputer 10 prepared outside the semiconductor integrated circuit 5 to make the microcomputer 10 process the various data.

The internal power supply regulator 39 of the semiconductor integrated circuit 5 is supplied with a voltage of, for example, 1.8 V to 2.2 V from the battery 7. Used as the battery 7 is, for example, a lithium ion battery. Further, the cutoff valve 11, the oscillation sensor 12, the pressure sensor 13, the display 14, etc., which are prepared outside the semiconductor integrated circuit 5, are prepared as functions included in the ultrasonic flowmeter according to the present invention, and these are also controlled by the microcomputer 10.

The above descriptions have been given with reference to FIG. 1, which is a circuit block diagram illustrating the ultrasonic flowmeter according to the present invention. One of the characteristics of the present invention is that the second oscillation device 43 and the third oscillation device 45 are incorporated in the semiconductor integrated circuit 5. In particular, with the second oscillation device 43 incorporated in the semiconductor integrated circuit 5, there is no need of providing a CR oscillator or a ceramic oscillator which has conventionally been prepared outside the semiconductor integrated circuit 5, and this contributes to a smaller, less expensive ultrasonic flowmeter. Here, with the second oscillation device 43 and the third oscillation device 45 incorporated in the semiconductor integrated circuit 5, there is apprehension over a disadvantageous increase in deviation between the frequencies (periods) of clocks generated by them. To overcome such a disadvantage, according to the present invention, a calibration circuit is provided for calibrating the actual frequencies (periods) of these clocks.

Figure 2:
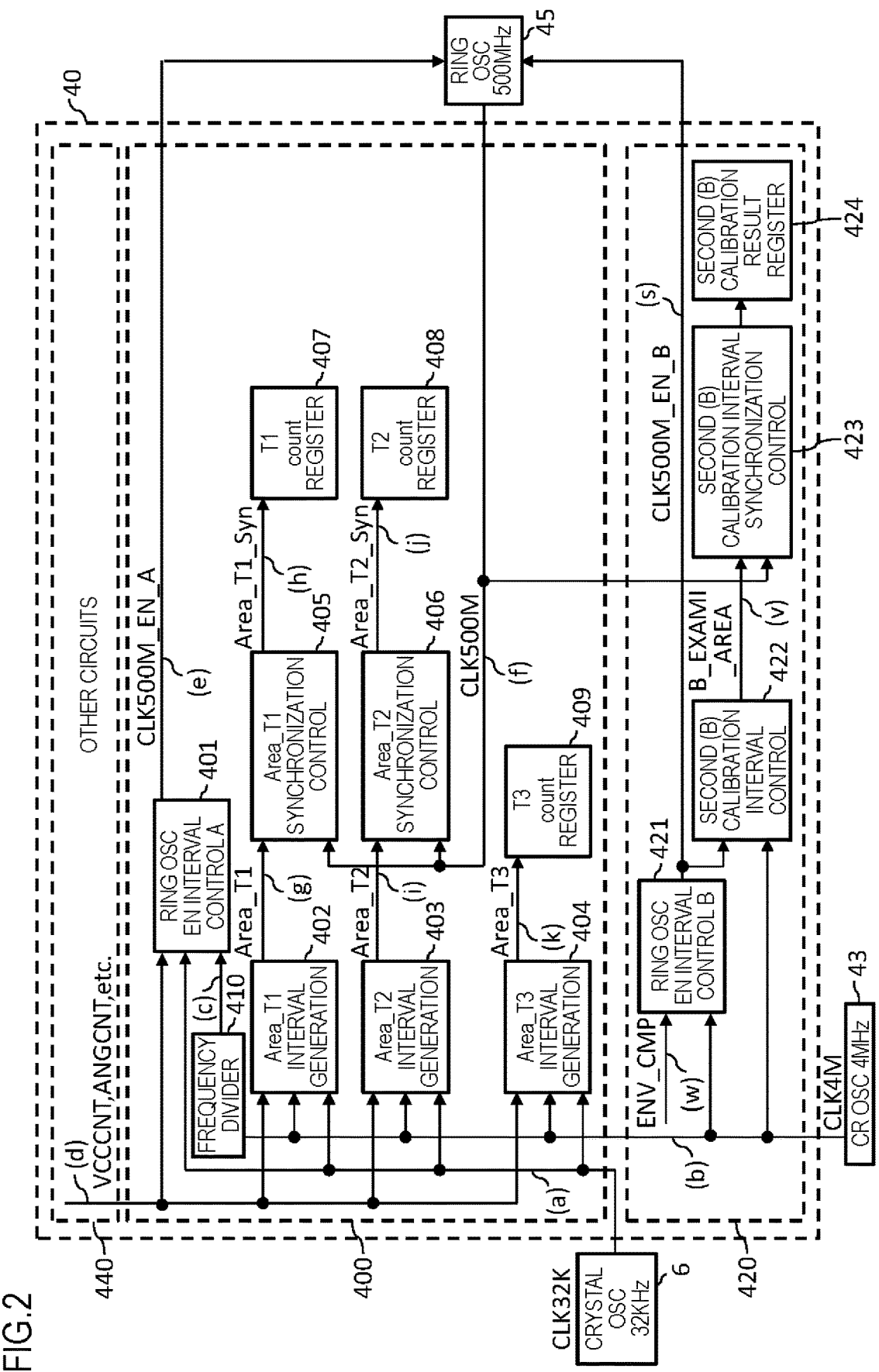
FIG. 2 is a circuit block diagram of a controller illustrated in FIG. 1.

FIG. 2 is a circuit block diagram specifically illustrating the controller 40 illustrated in FIG. 1. The controller 40 is one of the central circuits of the present invention, and controls the analogue portion 3 and the logic portion 4. The controller 40 also performs, for example, the measurement of the propagation time of a fluid, the calibration of the mid-speed clock, and the calibration of the high-speed clock. The calibration of the mid-speed clock and the calibration of the high-speed clock is performed in parallel with the measurement of the propagation time, not at a time different from the time at which the measurement of the propagation time is performed. Thereby, it is possible to restrain the increase of power consumption and to measure the propagation time quickly. To perform such calibration, the controller 40, as will be described later, generates various signals for the calibration of the mid-speed clock and for the calibration of the high-speed clock, based on various detection signals extracted from the first comparator 36, the second comparator 37, and the third comparator 38. This will become clear in a later-given description.

The controller 40 includes a first counter calibration circuit 400, a second counter calibration circuit 420, and other circuits 440. In the figure, signs (a) to (k) respectively indicate nodes from which there are extracted various signals corresponding to signs (a) to (k) in FIG. 4 and FIG. 5, which will be described later.

The first counter calibration circuit 400 is prepared for the purpose of calibrating the magnitude of the frequency (period) of, for example, a clock (mid-speed clock) that is generated by the second oscillation device 43 and whose frequency is 4 MHz. The frequency of the mid-speed clock is calibrated by using the high-speed clock generated by the third oscillation device 45 and having a frequency of 500 MHz and the low-speed clock generated by the first oscillation device 6 and having a frequency of 32 kHz. Here, in calibrating the high-speed clock, the mid-speed clock is used as a calibration signal.

The first counter calibration circuit 400 includes an interval controller 401. To the interval controller 401, there is applied a frequency-division clock CLK1M obtained by dividing the mid-speed clock CLK4M by four with a frequency divider 410. The first counter calibration circuit 400 includes an interval generator 402 and an interval generator 403 which detect a rising edge or a falling edge of a reference signal which serves as a reference for the flowmeter to measure the flow rate. The interval generator 402 detects, for example, the second rising edge of the low-speed clock CLK32k after calibration is started, and the interval generator 403 detects the subsequent third rising edge of the low-speed clock CLK32k. Accordingly, by the interval generators 402 and 403, one period of the reference signal is set. In short, the interval generator 402 serves as a circuit for identifying the start of calibration of a calibration signal, and the interval generator 403 serves as a circuit for identifying the end of the calibration.

The first counter calibration circuit 400 further includes an interval generator 404. The interval generator 404 generates an interval set based on a rising edge or a falling edge identified by the interval generators 402 and 403, and decides the calibration interval for calibrating the mid-speed clock (4 MHz), in other words, a time width in which to calibrate the mid-speed clock. Specifically, an interval from a rising edge of a pulse signal generated by the interval generator 402 until a falling edge of a pulse signal generated by the interval generator 403 is set as the calibration interval for the mid-speed clock.

The first counter calibration circuit 400 further includes synchronizers 405 and 406, and registers 407, 408, and 409. The synchronizer 405 is prepared for securely synchronizing data generated by the interval generator 402 with the high-speed clock (500 MHz) generated by the third oscillation device 45 and storing the data in the register 407 of the following stage. The synchronizer 406 is prepared for securely synchronizing data generated by the interval generator 403 with the high-speed clock (500 MHz) generated by the third oscillation device 45 and storing the data in the register 408 of the following stage.

The register 407 stores therein the data generated by the interval generator 402 and synchronized by the synchronizer 405. The register 408 stores therein the data generated by the interval generator 403 and synchronized by the synchronizer 406. The register 409 stores therein data generated by the interval generator 404, that is, the interval (time) in which the low-speed clock is the target of calibration.

To the interval generators 401 to 403, to the synchronizers 405 and 406, and to the registers 407 to 409 of the first counter calibration circuit 400, the various signals indicated by signs (a) to (k) are applied, and these various signals will be described later.

The controller 40 illustrated in FIG. 2 further includes a second counter calibration circuit 420. The second counter calibration circuit 420 is prepared for the purpose of calibrating the magnitude of the frequency of the high-speed clock which is generated by the third oscillation device 45. The oscillation frequency of the high-speed clock is calibrated by using the low-speed clock (4 MHz), which is generated by the first oscillation device 6. The second counter calibration circuit 420 includes an interval controller 421 which controls an interval in which the calibration of the high-speed clock is enabled, and to the interval controller 421, there is applied an envelope comparison signal ENV_CMP detected by an envelope comparator (the second comparator 37). The second counter calibration circuit 420 further includes a calibration interval controller 422 which calibrates the high-speed clock by using the low-speed clock, a synchronization controller 423 which performs synchronization to the high-speed clock extracted from the calibration interval controller 422, and a calibration result register 424 which stores therein data from the calibration interval controller 422. The circuit blocks illustrated in FIG. 2 simply represent one set of examples, and it should be comparatively easy for those skilled in the art to generate various signals sufficient for calibration performed by means of the low-speed clock, the mid-speed clock, the high-speed clock, and various logic circuits, etc.

Figure 3:
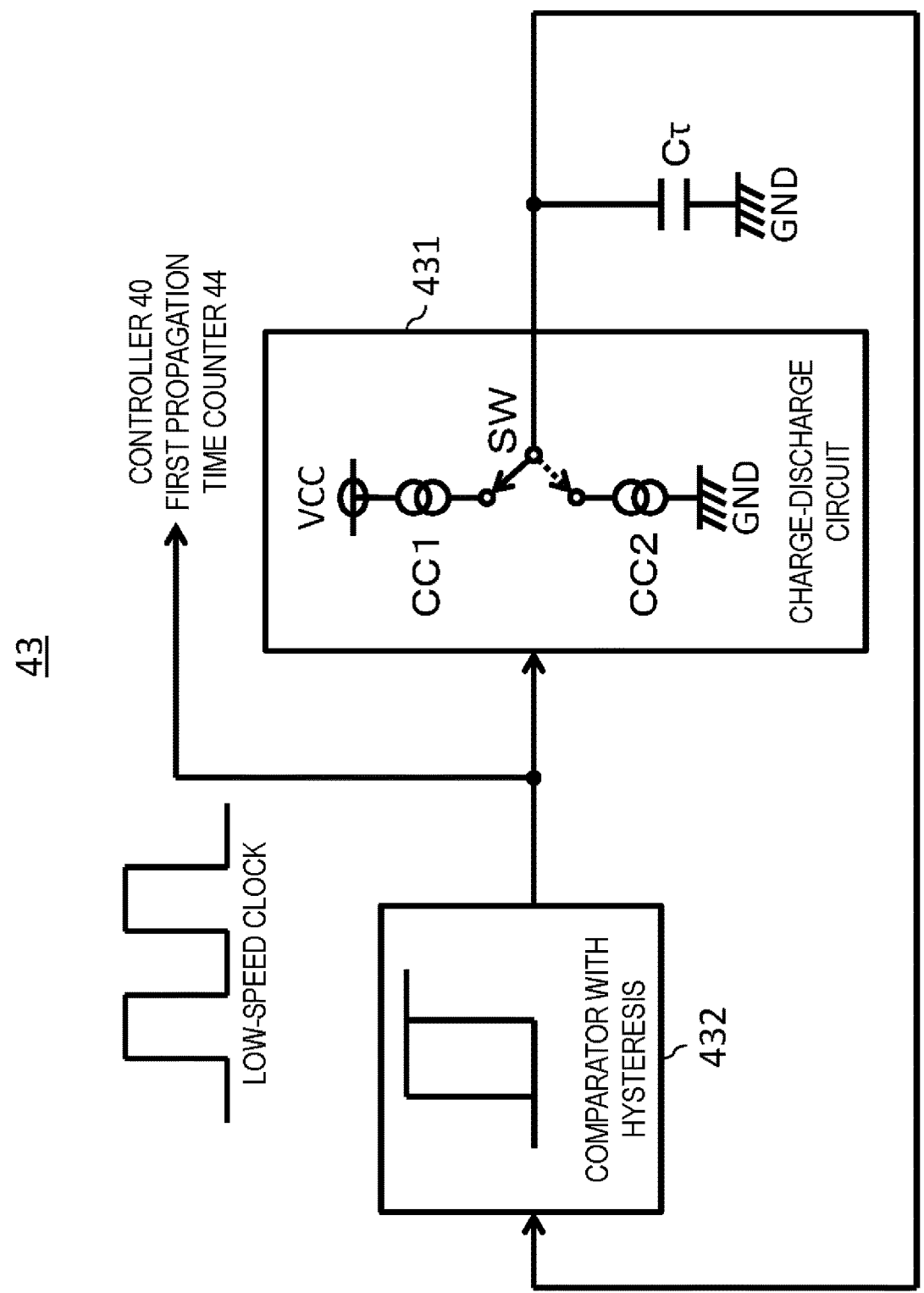
FIG. 3 is a circuit block diagram of a second oscillator (CR oscillator) illustrated in FIG. 1 and FIG. 2.

FIG. 3 is a circuit block diagram of the second oscillation device 43 illustrated in FIG. 1. The second oscillation device 43 includes a constant current source 431, and a comparator 432 with hysteresis. The constant current source 431 includes a first constant current source CC1 which is connected to a power supply VCC side, and a second constant current source CC2 which is connected to a ground voltage GND side. By the combination of these current sources, a switch SW, and the comparator 432 with hysteresis, a capacitor Cτ is repeatedly charged and discharged such that the rectangular mid-speed clock is outputted to be transmitted to the controller 40 and the first propagation time counter 44.

Figure 4:
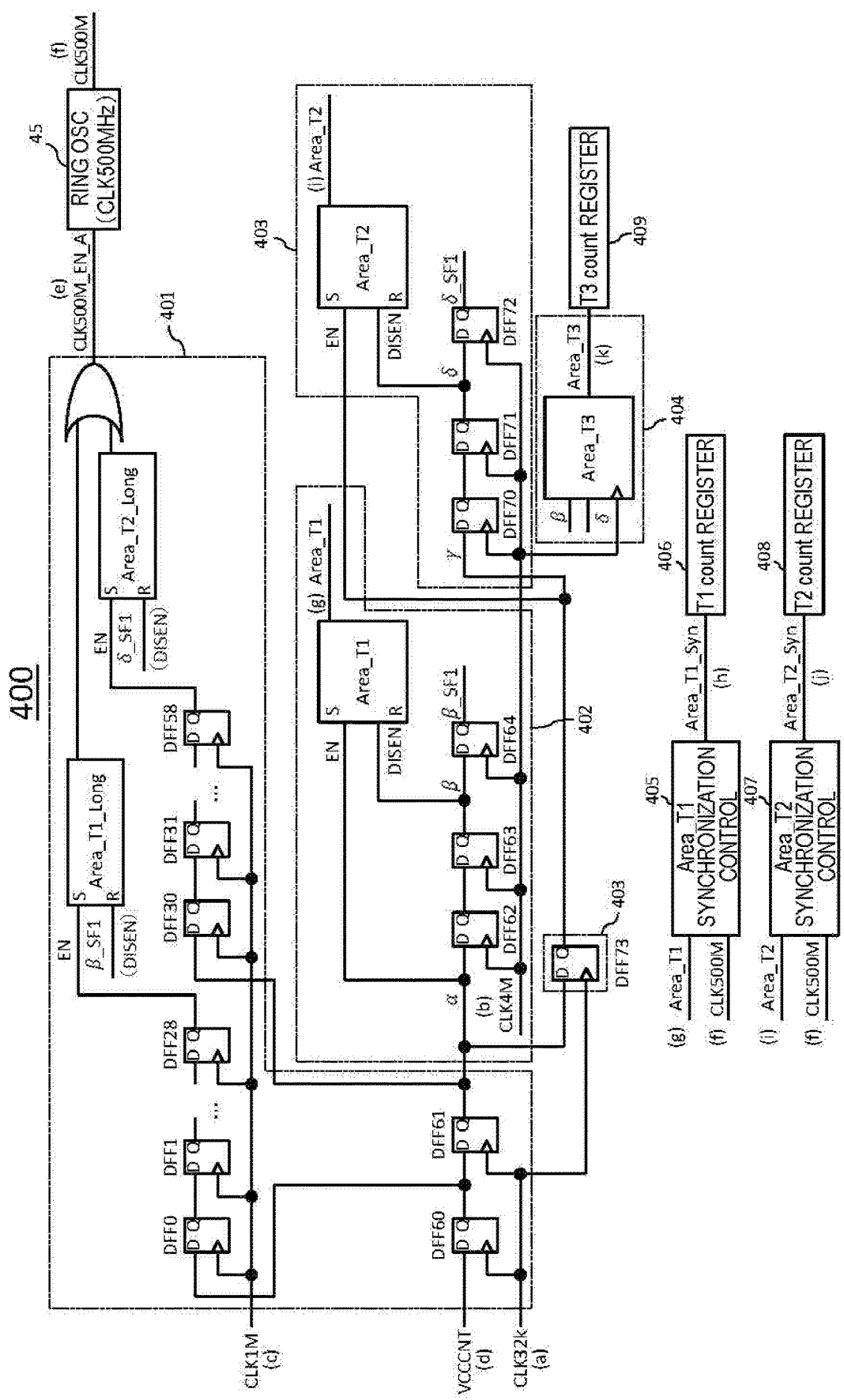
FIG. 4 is a specific circuit diagram of a first counter calibration circuit illustrated in FIG. 2.

FIG. 4 is a circuit block diagram illustrating the specific configuration of the first counter calibration circuit 400 illustrated in FIG. 2, that is, for example, a circuit for calibrating the mid-speed clock (4 MHz).

The interval controller 401 sets a high-speed clock (500 MHz) enable interval. The high-speed clock (500 MHz) is generated not constantly but in a limited generation interval. A control signal for enabling the generation of the high-speed clock (500 MHz) is generated by the interval controller 401. The interval controller 401 is constituted of various logic circuits including D flip-flops DFF0 to DFF28, DFF30 to DFF58, DFF60 to DFF64, and DFF70 to DFF73, and RS flip-flops Area_T1_Long and Area_T2_Long, and an OR circuit OR.

To the input terminals (indicated by triangle signs Δ) of the D flip-flops DFF0 to DFF28 and DFF30 to DFF58, the frequency-division clock CLK1M (whose frequency is 1 MHz), which is obtained by dividing the mid-speed clock CLK4M by four, is applied, and to the input terminals (indicated by triangle signs Δ) of the D flip-flops DFF60 and DFF61, the low speed clock CLK32k is applied. To the D input of the D flip-flop DFF0, the Q output of the D flip-flop DFF60 is applied. The Q output of the D flip-flop DFF0 is applied to the D input of the D flip-flop DFF1 of the following stage, and the Q outputs of the D flip-flops are sequentially applied to the D inputs of the following stages. The Q output of the D flip-flop DFF28 is applied, as an enable signal EN, to the set input terminal (S) of the RS flip-flop Area_T1_Long.

To the reset input terminal (R) of the RS flip-flop Area_T1_Long, the Q output β_SF1 of the D flip-flop DFF64 of the interval generator 402 is applied as a disable signal DISEN. The enable signal EN applied to the RS flip-flop Area_T1_Long is prepared to enable the operation of the third oscillation device 45 to generate the high-speed clock (500 MHz), and the disable signal DISEN (β_SF1) is prepared to disable the operation of the third oscillation device 45 to disable the generation of the high-speed clock (500 MHz).

To the D input of the D flip-flop DFF30, the Q output of the D flip-flop DFF61 is applied. The Q output of the D flip-flop DFF30 is applied to the D input of the D flip-flop DFF31 of the following stage, and the Q outputs of the D flip-flops are sequentially applied to the D inputs of the following stages. The Q output of the D flip-flop DFF58 is applied, as an enable signal EN, to the set input terminal (S) of the RS flip-flop Area_T2_Long.

To the reset input terminal (R) of the RS flip-flop Area_T2_Long, the Q output β_SF1 of the D flip-flop DFF72 of the interval generator 403 is applied as a disable signal DISEN. The enable signal EN applied to the RS flip-flop Area_T2_Long is prepared to enable the operation of the third oscillation device 45 to generate the high-speed clock (500 MHz), and the disable signal DISEN (δ_SF1) is prepared to disable the operation of the third oscillation device 45 to disable the generation of the high-speed clock (500 MHz).

Signals outputted from the RS flip-flop Area_T1_Long and the RS flip-flop Area_T2_Long are applied to the input terminal of the OR circuit OR. Thereby, when a signal is inputted from at least one of the RS flip-flops Area_T1_Long and Area_T2_Long, the third oscillation device 45 is allowed to generate the high-speed clock (500 MHz).

Based on an enable signal CLK500M_EN_A outputted from the OR circuit OR, the third oscillation device 45 is brought into an enabled state or a disabled state. When the enable signal CLK500M_EN_A is at high level, for example, the third oscillation device 45 is brought into the enabled state and the generation of the high-speed clock (500 MHz) is started, and when the enable signal CLK500M_EN_A is at low level, for example, the third oscillation device 45 is brought into the disabled state and the generation of the high-speed clock (500 MHz) is stopped.

Figure 5:
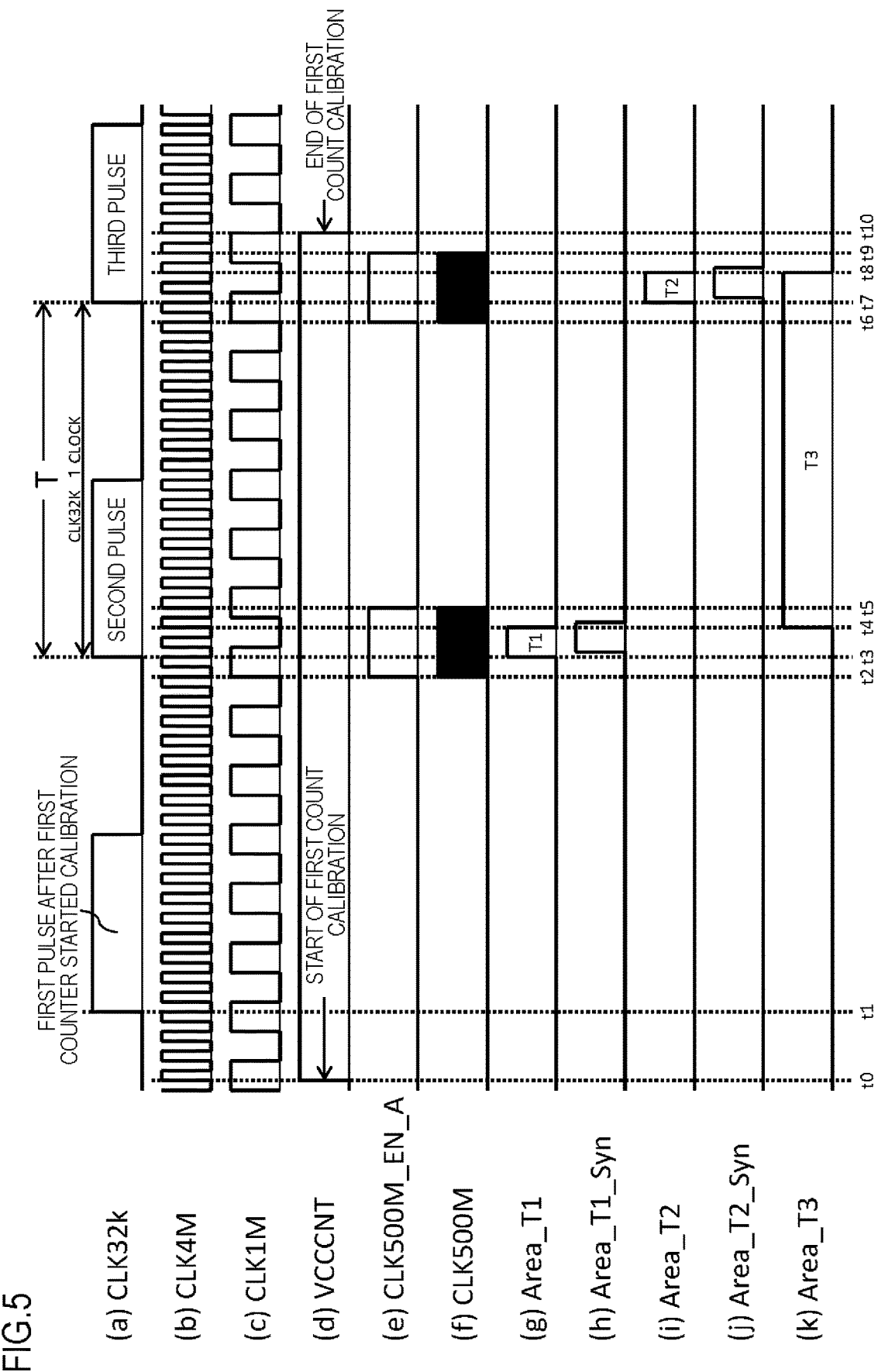
FIG. 5 is a timing chart for the first counter calibration circuit illustrated in FIG. 4.

The interval generator 402 sets an interval in which to calibrate the high-speed clock (500 MHz), that is, a first calibration interval T1, which is illustrated in FIG. 5 and will be described later. The first calibration interval T1, which is sequentially settable, starts at the rising edge of the second pulse of the low-speed clock (32 kHz), for example, and ends at the rising edge of the second pulse of the mid-speed clock (4 MHz) after the start of the first calibration interval T1, for example.

To the input terminals (indicated by triangle signs Δ) of the D flip-flops DFF62 to 64, the mid-speed clock CLK4M is applied. To the D input of the D flip-flop DFF62, the Q output α of the D flip-flop DFF61 is applied, and the Q output of the D flip-flop DFF62 is applied to the D input of the D flip-flop DFF63 of the following stage. The Q output β of the D flip-flop DFF63 is applied to the D input of the D flip-flop DFF64 of the following stage, and is further applied, as a disable signal DISEN, to the reset input terminal (R) of the RS flip-flop Area_T1. The Q output β_SF1 of the D flip-flop DFF64 is, as a disable signal DISEN, applied to the reset input terminal (R) of the RS flip-flop Area_T1_Long of the interval generator 401.

To the set input terminal (S) of the RS flip-flop Area_T1, Q output α of the D flip-flop DFF61 of the interval generator 401 is applied, and to the reset input terminal (R) of the RS flip-flop Area_T1, the Q output β of the D flip-flop DFF63 is applied as a disable signal DISEN. The output of the RS flip-flop Area_T1 is applied to an Area_T1 synchronization control 405.

The interval generator 403 sets an interval in which to calibrate the high-speed clock (500 MHz), that is, a second calibration interval T2, which is illustrated in FIG. 5 and will be described later. The second calibration interval T2 is also sequentially settable like the first calibration interval T1. The second calibration interval T2 starts at the rising edge of the third pulse of the low-speed clock (32 kHz), for example, and ends at the rising edge of the second pulse of the mid-speed clock (4 MHz) after the start of the second calibration interval T2, for example. Here, as will be clarified later, the interval generators 402 and 403 are used not only to set the calibration intervals for the high-speed clock (500 MHz), but also to set calibration intervals for the mid-speed clock (4 MHz).

To the input terminals (indicated by triangle signs Δ) of the D flip-flops DFF70 to 73, the mid-speed clock CLK4M is applied. To the D input of the D flip-flop DFF70, the Q output γ of the D flip-flop DFF73 is applied, and the Q output of the D flip-flop DFF70 is applied to the D input of the D flip-flop DFF71 of the following stage. The Q output δ of the D flip-flop DFF71 is applied to the D input of the D flip-flop DFF72 of the following stage, and is further applied, as a disable signal DISEN, to the reset input terminal (R) of an RS flip-flop Area_T2. The Q output δ_SF1 of the D flip-flop DFF72 is, as a disable signal DISEN, applied to the reset input terminal (R) of the RS flip-flop Area_T2_Long of the interval generator 402.

To the set input terminal (S) of the RS flip-flop Area_T2, Q output γ of the D flip-flop DFF73 is applied, and to the reset input terminal (R) of the RS flip-flop Area_T2, the Q output δ of the D flip-flop DFF71 is applied as a disable signal DISEN. The output of the RS flip-flop Area_T2 is applied to an Area_T2 synchronization control 407.

The interval generator 404 sets an interval in which to calibrate the mid-speed clock (4 MHz), that is, a mid-speed clock calibration interval T3, which is illustrated in FIG. 5 and will be described later. The interval generator 404 is constituted of a D flip-flop Area_T3. Applied to the input terminal (indicated by triangle sign Δ) of the D flip-flop Area_T3 is the mid-speed clock CLK4M, and applied to the D input of the D flip-flop Area_T3 is the Q output β of the D flip-flop DFF63 of the interval generator 402 and the Q output δ of the D flip-flop DFF71 of the interval generator 403. The Q output of the D flip-flop Area_T3 is applied to the register 409. The mid-speed clock calibration interval T3 set by the interval generator 404 is approximately equal to one period of the low-speed clock (32 kHz).

FIG. 5 is a timing chart at main nodes of the first counter calibration circuit 400 illustrated in FIG. 2 and FIG. 4. Hereinafter, descriptions will be given, based on FIG. 5, with reference to FIG. 1, FIG. 2, and FIG. 4.

The sign (a) in FIG. 5 indicates the low-speed clock CLK32k, which is generated by the first oscillation device 6 provided outside the semiconductor integrated circuit 5. With the first oscillation device 6 constituted of a crystal oscillator, for example, the deviation of the oscillation frequency is very small, and the magnitude of the deviation can be held within the range of 20 ppm to 30 ppm (0.002% to 0.003%), for example. The oscillation frequency of the low-speed clock CLK32k is approximately 32 kHz. The low-speed clock CLK32k becomes a reference clock for calibration in the present invention. One period of the low-speed clock CLK32k is observed in each of the intervals from time t1 to time t3 and from time t3 to time t7. The first, second, and third rising edges the low-speed clock CLK32k are respectively at times t1, t3, and t7.

The sign (b) in FIG. 5 indicates the mid-speed clock CLK4M, which is generated by the second oscillation device 43 provided inside the semiconductor integrated circuit 5. The second oscillation device 43 is constituted of, for example, a CR oscillator. The oscillation frequency of the mid-speed clock CLK4M is, for example, 4 MHz. The mid-speed clock CLK4M is used, for example, in measuring the propagation time of a fluid. The second oscillation device 43, which generates the mid-speed clock CLK4M, is disposed inside the semiconductor integrated circuit 5, and thus, the deviation of the oscillation frequency becomes disadvantageously larger than in a case where the second oscillation device 43 is constituted of a separate component, and the second oscillation device 43 becomes disadvantageously vulnerable to temperature-dependent effects. In the present invention, to overcome these disadvantages, the frequency (period) of the mid-speed clock CLK4M is calibrated, with the low-speed clock CLK32k as a reference, to thereby obtain the actual frequency (period) of the mid-speed clock CLK4M, and the propagation time is obtained based on the value of the actual frequency (period). Here, the mid-speed clock CLK4M is schematically illustrated for the sake of drawing, and its period is not aligned with the period of the low-speed clock CLK32k indicated by sign (a) in FIG. 5.

The sign (c) in FIG. 5 indicates the frequency-division clock CLK1M, which is applied to the clock input terminals of the D flip-flops DFF0 to DFF28 and DFF30 to DFF58, with which the interval controller 401 illustrated in FIG. 4 is constituted. The frequency-division clock CLK1M has a frequency of 1 MHz, and is generated by dividing the mid-speed clock CLK4M by four. Here, the number of stages of the D flip-flops DFF0 to DFF28 and the D flip-flops DFF30 to DFF58 is set in accordance with the period of the low-speed clock CLK32k.

The sign (d) in FIG. 5 indicates an enable signal VCCCNT for bringing the analogue portion 3 and the first counter calibration circuit 400 into an enabled state. When in the enabled state, the first counter calibration circuit 400 is enabled to execute a predetermined circuit operation. With the enable signal VCCCNT at high level, for example, the analogue portion 3 and so on execute a predetermined circuit operation, and the calibration in the first counter calibration circuit 400 is enabled. The enable signal VCCCNT is at high level in the interval from time t0 to time t10, which is longer than an interval equivalent to, for example, two periods of the low-speed clock CLK32k. In the interval from time t0 to t10, the measurement of the propagation time of a fluid and calibration of the mid-speed clock CLK4M and of the high-speed clock CLK500M are executed.

The sign (e) in FIG. 5 indicates an enable signal CLK500M_EN_A for enabling the generation of the high-speed clock CLK500M. The enable signal CLK500M_EN_A is outputted from the interval controller 401 illustrated in FIG. 2 and FIG. 4. The enable signal CLK500M_EN_A is outputted only in a predetermined interval, with the enable signal VCCCNT, indicated by the sign (d) in FIG. 5, at high level. For example, the enable signal CLK500M_EN_A is so set as to become high level in an interval starting before and ending after time t3, and in an interval starting before and ending after time t7, the period of the low-speed clock CLK32k being switched at time t3 and time t7. In short, the enable signal CLK500M_EN_A is so set as to become high level in the intervals between time t2 and time t5 and between time t6 and time t9, for example.

The sign (f) in FIG. 5 indicates the high-speed clock CLK500M, which is generated by the third oscillator (ring OSC) 45 illustrated in FIG. 1 and FIG. 2. The high-speed clock CLK500M is generated when the enable signal CLK500M_EN_A indicated by the sign (e) in FIG. 5 is at high level. The high-speed clock CLK500M is generated when the propagation time and the propagation velocity of a fluid (such as a gas) are measured and when the high-speed clock CLK500M is subjected to calibration. This contributes to reduction of power consumption. Here, the frequencies of the mid-speed clock CLK4M and of the high-speed clock CLK500M vary due to the production tolerance of the semiconductor integrated circuit 5. To deal with this, the first calibration circuit 400 and the second calibration circuit 420 illustrated in FIG. 2, for example, are prepared to calibrate the frequency (period) of the high-speed clock CLK500M.

The sign (g) in FIG. 5 indicates a first calibration interval Area_T1 for setting an interval in which to calibrate the high-speed clock CLK500M. The first calibration interval Area_T1 is at high level in the interval between time t3 and time t4, and in this interval, the number of pulses of the high-speed clock CLK500M is counted. The second rising edge of the low-speed clock CLK32k is at time t3, and at time t4, counting of a predetermined number of pulses of the mid-speed clock CLK4M starting from time t3 is completed. The first calibration interval Area_T1, as well as a second calibration interval Area_T2, which will be described later, serves as a signal for setting the calibration interval for the high-speed clock CLK500M and the calibration interval for the mid-speed clock CLK4M.

The sign (h) in FIG. 5 indicates a synchronization signal Area_T1_Syn, which is outputted from the synchronizer 405. The synchronization signal Area_T1_Syn serves as a synchronization signal in storing the first calibration interval Area_T1 in the register 407.

The sign (i) in FIG. 5 indicates a second calibration interval Area_T2 for setting an interval in which to calibrate the high-speed clock CLK500M. The second calibration interval Area_T2 is at high level in the interval between time t7 and time t8, and in this interval, the number of pulses of the high-speed clock CLK500M is counted. The third rising edge of the low-speed clock CLK32k is at time t7, and at time t8, counting of a predetermined number of pulses of the mid-speed clock CLK4M starting from time t7 is completed. The second calibration interval Area_T2 also serves as a signal for setting the calibration interval for the mid-speed clock CLK4M, which will be described later.

The sign (j) in FIG. 5 indicates a synchronization signal Area_T2_Syn, which is outputted from the synchronizer 406. The synchronization signal Area_T2_Syn serves as a synchronization signal in storing the second calibration interval Area_T2 in the register 408.

The sign (k) in FIG. 5 indicates a mid-speed clock calibration interval Area_T3 for setting an interval in which to calibrate the mid-speed clock 4M. The mid-speed clock calibration interval Area_T3 is high level in the interval between time t4 and time t8, and in this interval, the number of pulses of the mid-speed clock CLK4M is counted. The first calibration interval Area_T1 falls at time t4, and at time t8, the second calibration interval Area_T2 falls. The time width of the mid-speed clock calibration interval Area_T3 is approximately equal to the time width of one clock (one period) of the low-speed clock CLK32k. The mid-speed clock calibration interval Area_T3 is measured by means of the mid-speed clock CLK4M. Here, let the frequency of the low-speed clock CLK32$k$ be 32 kHz, and let the frequency of the mid-speed clock be, for example, exactly 4 MHz, then the number of clocks of the mid-speed clock CLK4M in one clock of the low-speed clock CLK32$k$ will be 40000/32=1250. Here, the number of clocks in the mid-speed clock CLK4M varies due to the production tolerance of the semiconductor integrated circuit 5. To deal with this, the first calibration circuit 400 illustrated in FIG. 2, for example, is prepared to calibrate the frequency (period) of the mid-speed clock CLK4M.

Figure 6:
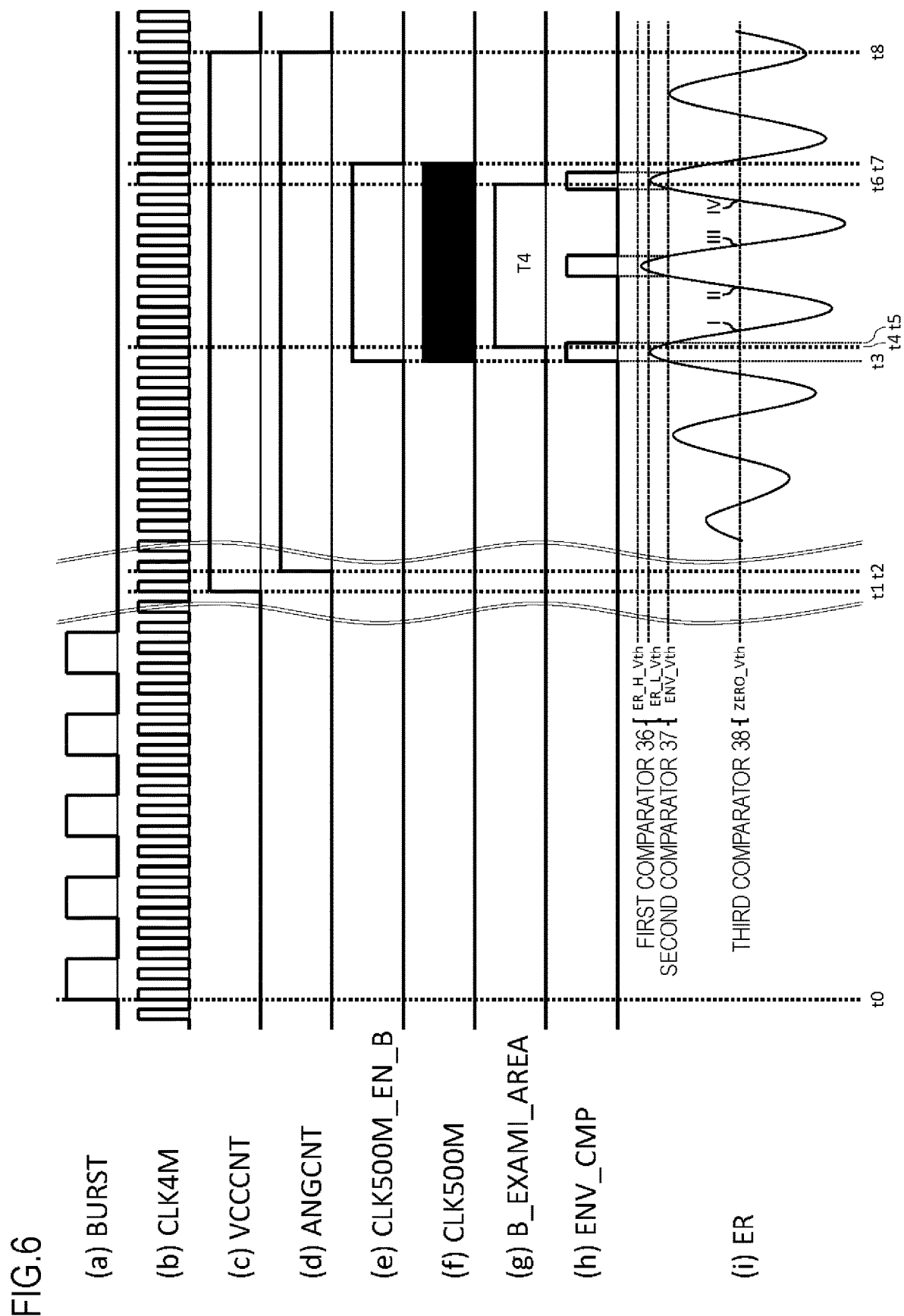
FIG. 6 is a timing chart for a received signal applied to a second counter calibration circuit illustrated in FIG. 4 and to first to third comparators.

FIG. 6 is a timing chart where there is illustrated a received signal applied to the second counter calibration circuit illustrated in FIG. 4, to the first comparator 36, to the second comparator 37, and to the third comparator 38. Hereinafter, descriptions will be given, based on FIG. 6, with reference to FIG. 1, FIG. 2, and FIG. 4.

The sign (a) in FIG. 6 indicates the burst waves BURST, which are transmitted from the transmitter 31 provided inside the semiconductor integrated circuit 5, via the switch 32, to the first oscillator 1 and the second oscillator 2. The burst waves BURST are, as previously described, an intermittently-generated rectangular wave signal having a frequency of 520 kHz, for example, and the number N of the burst waves BURST is set to N=5.

The sign (b) in FIG. 6 indicates the mid-speed clock CLK4M, which is generated by the second oscillation device 43, which is constituted of, for example, a CR oscillator and is provided inside the semiconductor integrated circuit 5. The normal frequency of the mid-speed clock CLK4M is, for example, 4 MHz. The mid-speed clock CLK4M is used, for example, in measuring the propagation time of a fluid, for example. The second oscillation device 43, which generates the mid-speed clock CLK4M, is disposed inside the semiconductor integrated circuit 5, and thus, the deviation of the oscillation frequency (period) becomes disadvantageously larger than in a case where the second oscillation device 43 is constituted of a separate component, and the second oscillation device 43 becomes disadvantageously vulnerable to temperature-dependent effects. In the present invention, to overcome these disadvantages, the frequency (period) of the mid-speed clock CLK4M is calibrated, with the low-speed clock CLK32$k$ as a reference, to thereby obtain the actual frequency (period) of the mid-speed clock CLK4M, and the value of the actual frequency (period) is reflected in the calculation of the propagation time.

The sign (c) in FIG. 6 indicates the enable signal VCCCNT for bringing the analogue portion 3 into an enabled state. The enable signal VCCCNT is applied from the controller 40 to the analogue portion 3. When the enable signal VCCCNT is set to high level, for example, the first amplifier 34 and the second amplifier 35 of the analogue portion 3 and the like is ready to execute a predetermined circuit operation.

The sign (d) in FIG. 6 indicates an enable signal ANGCNT, which, like the enable signal VCCCNT, is supplied from the controller 40 to bring the analogue portion 3 into the enabled state. When the enable signal ANGCNT is at high level, for example, in particular, the first comparator 36, the second comparator 37, and the third comparator 38 of the analogue portion 3 are ready to execute a predetermined circuit operation. The enable signal ANGCNT becomes high level at time t2, which is a little later than time t1 at which the enable signal VCCCNT becomes high level, and the enable signal ANGCNT remains high level until time t8. The first comparator 36, the second comparator 37, and the third comparator 38 operate on receiving a received signal (amplified signal) inputted from the second amplifier 35, and thus the enable signal ANGCNT is permitted to rise a little later than the enable signal VCCCNT.

The sign (e) in FIG. 6 indicates an enable signal CLK500M_EN_B for enabling the generation of the high-speed clock CLK500M performed by the third oscillation device 45 (a ring OSC). The enable signal CLK500M_EN_B is outputted from the interval controller 421, which is illustrated in FIG. 2. The enable signal CLK500M_EN_B is at high level at time t3, at which it is detected, by means of the second comparator (an envelope comparator) 37, that the received signal ER exceeds a predetermined threshold ENV_Vth, and remains at high level until time t7. The high-level interval of the enable signal CLK500M_EN_B is set, for example, to the interval between time t3 and time t7, in which, for example, four zero-cross points (indicated by the signs I, II, III, and IV) are present. It is desirable that the high-level interval of the enable signal CLK500M_EN_B be as short as possible. This is because the high-speed clock CLK500M is generated in the interval so that more power is consumed as this interval becomes longer. To reduce power consumption, too, it is desirable to shorten the interval in which the high-speed clock CLK500M is generated.

The sign (f) in FIG. 6 indicates the high-speed clock CLK500M, which is generated by the third oscillator (a ring OSC) 45 illustrated in FIG. 1 and FIG. 2. The high-speed clock CLK500M is generated when the enable signal CLK500M_EN_B, which is indicated by the sign (e) in FIG. 6, is at high level. The high-speed clock CLK500M is generated when the propagation time and the propagation velocity of a fluid (such as a gas) are measured and when the high-speed clock CLK500M is subjected to calibration. This contributes to reduction of power consumption.

The sign (g) in FIG. 6 indicates a calibration interval signal B_EXAMI_AREA, which is outputted from the calibration controller 422. The calibration interval signal B_EXAMI_AREA is for setting an interval in which to calibrate the high-speed clock CLK500M based on the mid-speed clock CLK4M. The calibration interval signal B_EXAMI_AREA is at high level in an interval T4, which is an interval between time t4 and time t6; time t4 is the first rising time of the mid-speed clock CLK4M after time t3, at which the second comparator 37 outputs high level, and time t6 is the first rising time of the mid-speed clock CLK4M after the measurement of the fourth zero-cross point IV is finished. Calibration is performed by counting the high-speed clock CLK500M in the interval T4. Selected as the time width of the interval T4 is a width equivalent to a predetermined number of clocks of the mid-speed clock CLK4M, the predetermined number being equal to or more than one but equal to or less than fourteen, for example. Whichever the predetermined number may be, the calibration interval signal B_EXAMI_AREA is set such that it becomes high level after the enable signal CLK500M_EN_B and becomes low level before the enable signal CLK500M_EN_B. This is for the purpose of calibrating the high-speed clock CLK500M by means of the mid-speed clock 4M after the high-speed clock CLK500M is brought into a stable state.

The sign (h) in FIG. 6 indicates the envelope comparison signal ENV_CMP, which is outputted from the second comparator 37. The envelope comparison signal ENV_CMP becomes high level when the received signal rises above the predetermined threshold ENV_Vth, and becomes low level when it falls below the threshold ENV_Vth. The data (information) is sent to the controller 40, and further is sent from the controller 40 to the second propagation time counter 46.

The sign (i) in FIG. 6 schematically indicates the received signal ER, which is a schematically illustrated example of a signal extracted from the second amplifier 35 illustrated in FIG. 1. The received signal ER is commonly applied to the first comparator 36, the second comparator 37, and the third comparator 38. The predetermined thresholds ER_H_Vth and ER_L_Vth, which are set for detecting the crest of the received signal ER, are detected by the first comparator 36, the predetermined threshold ENV_Vth, which is set for detecting the received signal ER, is detected by the second comparator 37, and the zero-cross points I, II, III, and IV are detected by the third comparator 38. Here, for convenience of description, in the received signal ER indicated by the sign (i) in FIG. 6, there are illustrated three to four waves and four zero-cross points (I to IV) after the received signal ER rises above the threshold ENV_Vth, that is, after time t3. Here, it is possible to secure four zero-cross points even when the number of waves is at least two. However, although there is no limitation on the number of zero-cross points to be detected, the number is appropriately three or more but six or less. By increasing the number of zero-cross points to be detected, it is possible to measure the propagation time more accurately, but then the measurement takes a disadvantageously increased time. In the present invention, four zero-cross points are detected in each of a total of 64 packets. Accordingly, the detection of zero-cross point is practically performed 256 times, the average of which is used in the measurement of propagation time.

Figure 7:
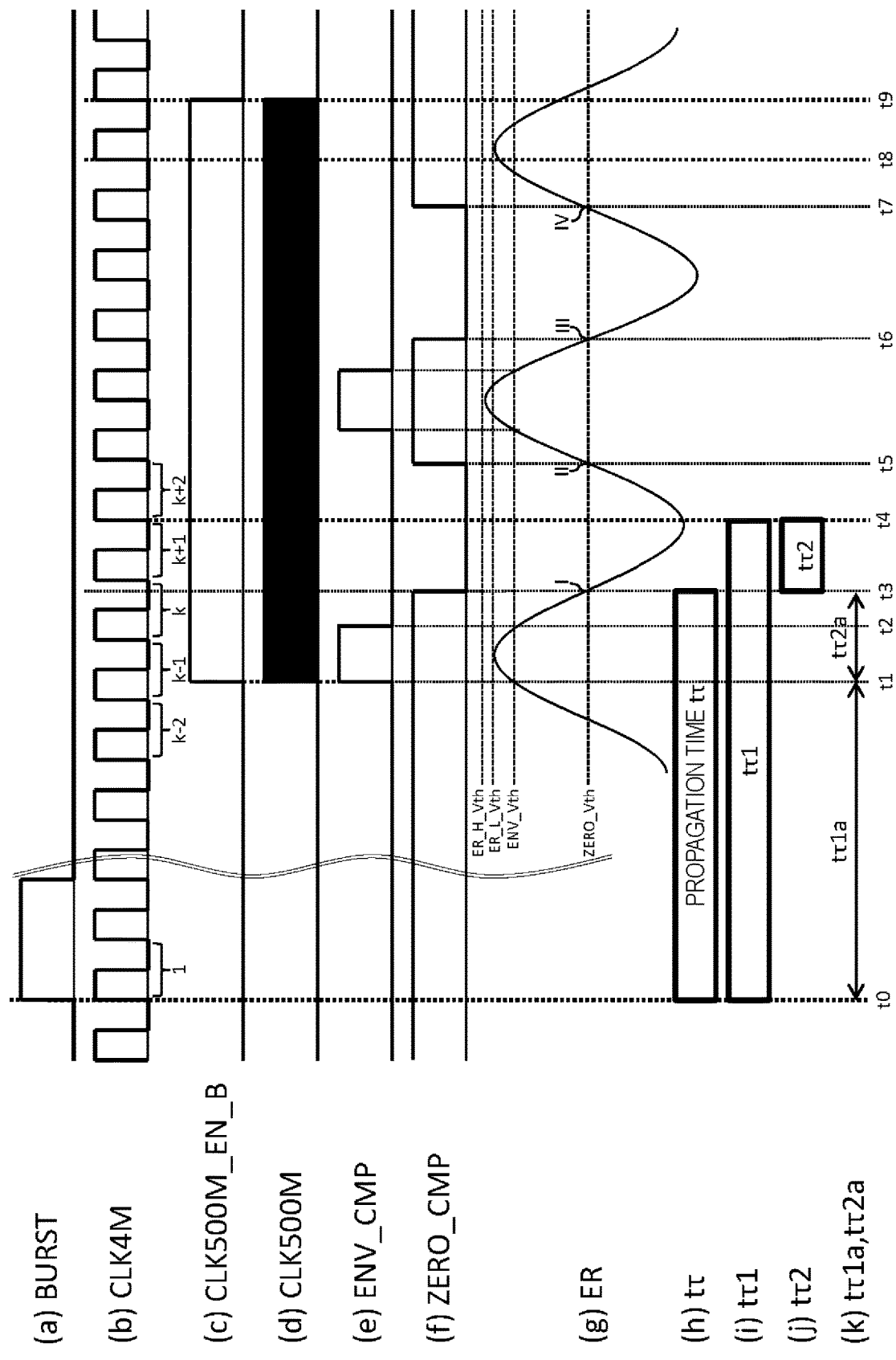
FIG. 7 is a timing chart for illustrating the measuring of a propagation time according to the present invention.

FIG. 7 is a timing chart prepared by enlarging part of FIG. 6, for a further description of the measurement of propagation time. A description will be given with reference to FIG. 7, though the description will overlap with the description given above with reference to FIG. 6.

The sign (a) in FIG. 7 indicates the burst waves BURST, which are transmitted from the transmitter 31, which is incorporated in the semiconductor integrated circuit 5, via the switch 32, to the first oscillator 1 and the second oscillator 2. The burst waves BURST are, as described previously, a intermittently-generated rectangular wave signal having a frequency of, for example, 520 kHz, and the number N of the burst waves BURST is set to N=5, but only one wave is illustrated in the burst waves Burst indicated by the sing (a) in FIG. 7.

The sign (b) in FIG. 7 indicates the mid-speed clock CLK4M, which is generated by the second oscillation device 43, which is constituted of, for example, a CR oscillator and is incorporated in the semiconductor integrated circuit 5. The normal frequency of the mid-speed clock CLK4M is, for example, 4 MHz. The mid-speed clock CLK4M, in synchronization with the low-speed clock CLK32$k$, or in synchronization with sequential timing, for example, timing of detecting the threshold ENV_Vth and zero-cross points, is used as a means for measuring the propagation time of a fluid. As for the mid-speed clock CLK4M, since the second oscillation device 43, which generates the mid-speed clock CLK4M, is incorporated in the semiconductor integrated circuit 5, the deviation of the oscillation frequency (period) is disadvantageously larger than in a case where the second oscillation device 43 is constituted of a separate component, and the second oscillation device 43 becomes disadvantageously vulnerable to temperature-dependent effects. In the present invention, to overcome these disadvantages, the frequency (period) of the mid-speed clock CLK4M is calibrated with the low-speed clock CLK32$k$ as a reference, to thereby obtain the actual frequency (period) of the mid-speed clock CLK4M, and the value of the actual frequency (period) is reflected in the calculation of the propagation time.

The sign (c) in FIG. 7 indicates the high-speed clock enable signal CLK500M_EN_B for enabling the generation of the high-speed clock CLK500M performed by the third oscillation device 45 (ring OSC). The high-speed clock enable signal CLK500M_EN_B is outputted from the interval controller 421, which is illustrated in FIG. 2. The high-speed clock enable signal CLK500M_EN_B is at high level at time t3, at which it is detected, by means of the second comparator (an envelope comparator) 37, that the received signal ER exceeds the predetermined threshold ENV_Vth, and remains at high level until time t7. The high-level interval of the high-speed clock enable signal CLK500M_EN_B is set, for example, to the interval between time t3 and time t7, in which, for example, four zero-cross points (indicated by the signs I, II, III, and IV) are present. It is desirable that the high-level interval of the high-speed clock enable signal CLK500M_EN_B be as short as possible. This is because the high-speed clock CLK500M is generated and hence power consumption is increased in this interval. To reduce power consumption, too, it is desirable to shorten the interval in which the high-speed clock CLK500M is generated.

The sign (d) in FIG. 7 indicates the high-speed clock CLK500M, which is generated by the third oscillator (ring OSC) 45 illustrated in FIG. 1 and FIG. 2. The high-speed clock CLK500M is generated when the high-speed clock enable signal CLK500M_EN_B indicated by the sign (c) in FIG. 7 is at high level. The high-speed clock CLK500M is generated simultaneously when the propagation time and the propagation velocity of a fluid (such as a gas) are measured and when the high-speed clock CLK500M is subjected to calibration. This contributes to reduction of power consumption.

The sign (e) in FIG. 7 indicates the envelope comparison signal ENV_CMP, which is outputted from the second comparator 37. The envelope comparison signal ENV_CMP becomes high level when the received signal rises above the predetermined threshold ENV_Vth, and becomes low level when it falls below the threshold ENV_Vth. The envelope comparison signal ENV_CMP is processed by the controller 40.

The sign (f) in FIG. 7 indicates a zero-cross detection signal ZERO_CMP, which is outputted from the third comparator 38. The zero-cross detection signal ZERO_CMP becomes high level when the received signal rises above the zero-cross points I to IV, and becomes low level when the received signal falls below the zero-cross points I to IV. Accordingly, the zero-cross detection signal ZERO_CMP is at high level between time t0 and time t1, between time t4 and time t5, and between time t6 and time t8. The zero-cross detection signal ZERO_CMP is processed by the controller 40.

The sign (g) in FIG. 7 schematically indicates the received signal ER, which is extracted from the second amplifier 35 illustrated in FIG. 1. The received signal ER is commonly applied to the first comparator 36, the second comparator 37, and the third comparator 38. The predetermined thresholds ER_H_Vth and ER_L_Vth, which are set for the detection of the crest of the received signal ER, are detected by the first comparator 36, the predetermined threshold ENV_Vth, which is set for the detection of the received signal ER, is detected by the second comparator 37, and the zero-cross points I to IV are detected by the third comparator 38. Here, for convenience of description, in the received signal ER indicated by the sign (g) in FIG. 7, there are illustrated three to four waves and four zero-cross points (I to IV) after the received signal ER rises above the threshold ENV_Vth, that is, after time t3. Here, it is possible to secure four zero-cross points even when the number N of waves is at least two. However, although there is no limitation on the number of zero-cross points to be detected, the number is appropriately three or more but six or less. By detecting an increased number of zero-cross points, it is possible to measure the propagation time more accurately, but then the measurement takes a disadvantageously increased time. In the present invention, four zero-cross points are detected in each of a total of 64 packets. Accordingly, the propagation time is measured as the average of the results of the detection performed 256 times.

The sign (h) in FIG. 7 indicates the propagation time tτ. Time from the transmission time of the burst waves Burst when the burst waves BURST is transmitted, which is at time t0, for example, until when the received signal ER reaches the first zero-cross point I after rising above the threshold ENV is indicated as the propagation time tτ. The actual measurement of the propagation time is performed not only until the received signal ER reaches the zero-cross point I but also until the received signal ER reaches the zero-cross points II, III, and IV, by obtaining the average of the measurement results. Here, the transmission time of the burst waves BURST does not necessarily refer to the first rising edge of the burst waves BURST, and the last wave of the burst waves BURST may be used as a reference. Alternatively, an intermediate time between the first wave and the last wave of the burst waves BURST may be the transmission time.

The sign (i) in FIG. 7 indicates a first propagation time tτ1. The measurement of the first propagation time tτ1 is prepared as a means for obtaining the propagation time tτ. The measurement of the first propagation time tτ1 is performed by using the mid-speed clock CLK4M. Here, using the high-speed clock CLK500M to measure the first propagation time tτ1 is not preferable, because it increases the power consumption in the measurement. The first propagation time tτ1 may be a time from time t0 until time t4, for example; time t0 is a transmission time of the burst waves BURST, for example, and time t4 is an intermediate time between the time when the received signal ER reaches the zero-cross point I and the time when the received signal ER reaches the zero-cross point II. Here, let the number of clocks of the mid-speed clock CLK4M indicated by the sign (b) in FIG. 7 be k, then the time at which the first propagation time tτ1 ends is when the (k+1)th clock, which is one clock later than the kth clock, is being generated. However, the number of clocks to be counted does not necessarily need to be one, and as for until the zero-cross point II, two clocks or three clocks may be counted. In whichever case, this relationship is to be appropriately set in accordance with the frequency of the burst waves BURST and the frequency of the mid-speed clock.

According to what is indicated by the sign (i) in FIG. 7, the ending time of the first propagation time tτ1 is set based on the zero-cross point I, and likewise, in a case where the ending of the first propagation time is decided by detecting the zero-cross point II, the ending of the first propagation time tτ1 comes between the zero-cross points II and III.

Here, the ending time of the first propagation time tτ1 indicated by the sign (i) in FIG. 7 is set between the zero-cross point I and the zero-cross point II, but the ending time of the first propagation time tτ1 may be time t1. Time t1 is a time at which it is detected by using the second comparator 37 that the received signal ER exceeds the threshold ENV_Vth, and is also a time at which the high-speed clock CLK500M starts to be generated.

The sign (j) in FIG. 7 indicates a second propagation time tτ2. The measurement of the second propagation time tτ2 is performed by using the high-speed clock CLK500M. The second propagation time tτ2 is set to be from the zero-cross point I until time t4, which is the ending time of the first propagation time tτ1. That is, the second propagation time tτ2 and the first propagation time tτ1 are set to end at the same time. This makes it easy to obtain the propagation time tτ. Here, with respect to the second propagation time tτ2, too, measurement is performed with the zero-cross points II, III, and IV as references, like with respect to the first propagation time tτ1.

When the measurement of the second propagation time tτ2 and the measurement of the first propagation time tτ1 are finished, the final propagation time tτ can be obtained as a difference between them, that is, through the formula tτ1−tτ2=tτ.

Next, a description will be given of another method for obtaining the propagation time tr. The method is, in short, a method of obtaining the propagation time tτ as a sum of a first propagation time tτ1a and a second propagation time tτ2a. This calculation method will be described with reference to what is indicated by the sign (k) in FIG. 7. First, the first propagation time tτ1a is obtained. The first propagation time tτ1a is a time from time t0, at which the burst waves BURST are transmitted, until time t1, at which it is detected by using the second comparator 37 that the received signal ER exceeds the predetermined threshold ENV_Vth, and this propagation time is obtained by the first propagation time counter 44 counting the mid-speed clock CLK4M. The second propagation time tτ2a is obtained by the second propagation time counter 45 counting from time t1 until time t3, at which the zero-cross point I is detected. Based on the thus obtained first propagation time tτ1a and second propagation time tτ2a, the propagation time tτ can be obtained through the formula tτ=tτ1a+tτ2a. Here, the first propagation time tτ1a and the second propagation time tτ2a are obtained not only with respect to the zero-cross point I, but also with respect to the other zero-cross points likewise.

In obtaining the first propagation time tτ1a, the ending time of the first propagation time tτ1a and the starting time of the second propagation time tτ2a do not need to be limited to a time at which it is detected by using the second comparator (envelope comparator) 37 that the received signal ER exceeds the predetermined threshold ENV_Vth. These times may be set in any interval before the threshold ENV_Vth is detected. In whichever case, the starting time of the second propagation time tτ2a is decided based on the ending time of the first propagation time tτ1a. At the starting time of the second propagation time tτ2a, it is necessary that the high-speed clock CLK500M is generated.

To follow is an overview of the features of various embodiments disclosed herein.

According to one aspect of the present invention, an ultrasonic flowmeter includes a first oscillator and a second oscillator which are disposed at a fluid pipe in which a fluid flows, and which transmit and receive ultrasonic signals to and from each other, a transmitter which transmits burst waves to the first oscillator or to the second oscillator, a switch which switches the first oscillator and the second oscillator to either a transmission side or a reception side, an amplifier which amplifies a received signal generated by the first oscillator or by the second oscillator, a first comparator where a predetermined threshold is set, and which checks whether a crest of an amplified signal outputted from the amplifier falls within a predetermined range, a second comparator where a threshold that is smaller than the threshold of the first comparator is set, and which checks whether the amplified signal exceeds a predetermined threshold, a third comparator which detects a plurality of zero-cross points in the amplified signal, and a time counter which measures a propagation time from when the burst waves are transmitted until when the amplified signal reaches a zero-cross point of the plurality of zero-cross points. Here, the time counter is provided with a low-speed clock, a mid-speed clock whose frequency is calibrated with the mid-speed clock, and whose propagation time is shorter than a propagation time of the low-speed clock, and a high-speed clock whose frequency is calibrated with the mid-speed clock, and whose propagation time is shorter than the propagation time of the mid-speed clock. A first propagation time is measured by a first propagation time counter using the mid-speed clock. A second propagation time is measured by a second propagation time counter using the high-speed clock. The propagation time is obtained from a difference between, or a sum of, the first propagation time and the second propagation time. Thereby, it is possible to reduce the operation time of the high-speed clock, during which a large amount of power is consumed, to a minimum necessary length.

In a specific embodiment of the ultrasonic flowmeter according to the present invention, measurement of the first propagation time tτ1 with the mid-speed clock starts when the burst waves are transmitted, and ends between the zero-cross point and a next zero-cross point of the plurality of zero-cross points, measurement of the second propagation time tτ2 with the high-speed clock starts when the zero-cross point is detected, and ends when the measurement of the first propagation time tτ1 ends, and the propagation time tτ is obtained through the formula tτ=tτ1−tτ2. Thereby, it is possible to obtain the propagation time tτ by means of a very simple formula.

In another specific embodiment of the ultrasonic flowmeter according to the present invention, measurement of the first propagation time tτ1a with the mid-speed clock starts when the burst waves are transmitted, and ends in any interval before the third comparator detects the zero-cross point, measurement of the second propagation time tτ2a with the high-speed clock starts when the measurement of the first propagation time tτ1a ends, and ends when the zero-cross point is detected, and the propagation time tτ is obtained through the formula tτ=tτ1a+tτ2a. Thereby, it is possible to obtain the propagation time tτ by means of a very simple formula.

In another specific embodiment of the ultrasonic flowmeter according to the present invention, measurement of the first propagation time tτ1a with the mid-speed clock starts when the burst waves are transmitted, and ends in any interval before it is detected by using the second comparator that the amplified signal exceeds the threshold, measurement of the second propagation time tτ2a with the high-speed clock starts when the measurement of the first propagation time tτ1a ends, and ends when the third comparator detects the zero-cross point, and the propagation time tτ is obtained through the formula tτ=tτ1a+tτ2a. Thereby, it is possible to obtain the propagation time tτ by means of a very simple formula.

In another specific embodiment of the ultrasonic flowmeter according to the present invention, measurement of a propagation time tτ is performed in parallel with calibration of the mid-speed clock and calibration of the high-speed clock. Thereby, it is possible to restrain the increase of power consumption and to measure the propagation time quickly.

In another specific embodiment of the ultrasonic flowmeter according to the present invention, measurement of the propagation time is performed with respect to the amplified signal that has two or more crests as the crest and has four or more zero-cross points as the plurality of zero-cross points. Thereby, it is possible to highly accurately measure the propagation time.

In another specific embodiment of the ultrasonic flowmeter according to the present invention, detection of the zero-cross point by the third comparator is performed after it is detected by using the second comparator that the amplified signal exceeds the threshold. Thereby, the target of the propagation-time measurement is limited to what satisfies a predetermined amplitude level, and thus it is possible to perform the measurement highly accurately.

In another specific embodiment of the ultrasonic flowmeter according to the present invention, the amplifier includes a first amplifier which amplifies the received signal to a predetermined amplitude value, and a second amplifier which finely adjusts a first amplified signal outputted from the first amplifier to a predetermined level. Thereby, it is possible to adjust the magnitude of the received signal accurately, and thus to improve the accuracy of the signal processing performed in a subsequent stage.

In another specific embodiment of the ultrasonic flowmeter according to the present invention, the second amplifier is constituted of a programmable gain amplifier (PGA). Thereby, it is possible to enhance the accuracy of the fine adjustment of gain.

In another specific embodiment of the ultrasonic flowmeter according to the present invention, calibration of the high-speed clock with the mid-speed clock is started later than the high-speed clock is generated. Thereby, it is possible to perform calibration with the high-speed clock, with the high-speed clock in a stable state, and thus to enhance the accuracy of calibration.

In another specific embodiment of the ultrasonic flowmeter according to the present invention, a start of calibration of the high-speed clock coincides with a rising edge or a falling edge of the low-speed clock. Thereby, it is possible to maintain appropriate relationship between the frequency (period) of the high-speed clock, the frequency (period) of the mid-speed clock, and the frequency (period) of the low-speed clock.

In another specific embodiment of the ultrasonic flowmeter according to the present invention, a calibration interval for calibrating the high-speed clock includes a first interval zone set based on a predetermined number of clocks of the mid-speed clock counted from an Nth rising edge or an Nth falling edge of the low-speed clock, N being an integer equal to or greater than one, and a second interval zone set based on a predetermined number of clocks of the mid-speed clock counted from an (N+1)th rising edge or an (N+1)th falling edge of the low-speed clock. Thereby, it is possible to calibrate the high-speed clock and the mid-speed clock within the same one clock (one period) as the calibration of the low-speed clock, and thus to enhance the accuracy of calibration.

In another specific embodiment of the ultrasonic flowmeter according to the present invention, a time width of a calibration interval for calibrating the mid-speed clock with the low-speed clock is from a falling edge of the first interval zone until a falling edge of the second interval zone.

Thereby, it is possible to appropriately set the calibration interval for calibrating the mid-speed clock.

In another specific embodiment of the ultrasonic flowmeter according to the present invention, T=T1−T2+T3 holds, where T1 represents a time width of the first interval zone, T2 represents a time width of the second interval zone, T3 represents a time width from the falling edge of the first interval zone until the falling edge of the second interval zone, and T represents a time width of one period of the low-speed clock. Here, the time widths T1 and T2 for the calibration of the high-speed clock and the time width T3 for the calibration of the mid-speed clock are chosen such that the result of addition and subtraction with these widths is equal to the time width T of the low-speed clock, which is the reference clock, and thereby, it is possible to enhance the accuracy of the calibration of the mid-speed clock and of the high-speed clock.

In another specific embodiment of the ultrasonic flowmeter according to the present invention, calibration of the high-speed clock is performed in the time width T1 and in the time width T2, and calibration of the mid-speed clock is performed in the time width T3. Thereby, the mid-speed clock and the high-speed clock are both calibrated in the same one period of the low-speed clock, and thus it is possible to enhance the accuracy of the calibration of the two clocks.

In another specific embodiment of the ultrasonic flowmeter according to the present invention, the transmitter, the switch, the amplifier, the first comparator, the second comparator, the third comparator, a generator that generates the high-speed clock, the first propagation time counter, and the second propagation time counter are incorporated in one same semiconductor integrated circuit. Thereby, many circuit portions are incorporated in the semiconductor integrated circuit, and thus it is possible to achieve an inexpensive ultrasonic flowmeter capable of quickly measuring the flow rate.

In another specific embodiment of the ultrasonic flowmeter according to the present invention, the low-speed clock is generated by a crystal oscillator, the high-speed clock is generated by a ring oscillator, the mid-speed clock is generated by a CR oscillator or a ceramic oscillator, the crystal oscillator and the ceramic oscillator are disposed outside the semiconductor integrated circuit, and the CR oscillator and the ring oscillator are incorporated in the semiconductor integrated circuit. Thereby, the CR oscillator and the ring oscillator are incorporated in the semiconductor integrated circuit, and thus it is possible to achieve a compact and inexpensive ultrasonic flowmeter.

Advantageous Effects of the Invention

Since a CR oscillator and a ring oscillator are incorporated in a semiconductor integrated circuit, it is possible to achieve a compact and inexpensive ultrasonic flowmeter, and further, since a high-frequency oscillator is used in a limited interval in measuring the flow rate, it is possible to reduce power consumption and achieve high-speed measurement of the flow rate.

Industrial Applicability

As has been discussed above, according to the present invention, it is possible to achieve a compact and inexpensive ultrasonic flowmeter capable of accurately measuring the flow velocity and the flow rate of a liquid or of a gas, and thus the present invention is applicable to gas meters, water meters, etc. Hence, the present invention has very high industrial applicability.

What is claimed is:

1. An ultrasonic flowmeter comprising:
    a first oscillator and a second oscillator which are disposed at a fluid pipe in which a fluid flows, and which transmit and receive ultrasonic signals to and from each other;
    a transmitter which transmits burst waves to the first oscillator or to the second oscillator;
    a switch which switches the first oscillator and the second oscillator to either a transmission side or a reception side;
    an amplifier which amplifies a received signal generated by the first oscillator or by the second oscillator;
    a first comparator where a predetermined threshold is set, and which checks whether a crest of an amplified signal outputted from the amplifier falls within a predetermined range;
    a second comparator where a threshold that is smaller than the threshold of the first comparator is set, and which checks whether the amplified signal exceeds a predetermined threshold;
    a third comparator which detects a plurality of zero-cross points in the amplified signal; and
    a time counter which measures a propagation time from when the burst waves are transmitted until when the amplified signal reaches a zero-cross point of the plurality of zero-cross points,
    wherein
        the time counter is provided with a low-speed clock,
        a mid-speed clock whose frequency is calibrated with the mid-speed clock, and whose propagation time is shorter than a propagation time of the low-speed clock, and
        a high-speed clock whose frequency is calibrated with the mid-speed clock, and whose propagation time is shorter than the propagation time of the mid-speed clock,
        a first propagation time is measured by a first propagation time counter using the mid-speed clock,
        a second propagation time is measured by a second propagation time counter using the high-speed clock, and
        the propagation time is obtained from a difference between, or a sum of, the first propagation time and the second propagation time.

2. The ultrasonic flowmeter according to claim 1, wherein measurement of the first propagation time $t\tau1$ with the mid-speed clock starts when the burst waves are transmitted, and ends between the zero-cross point and a next zero-cross point of the plurality of zero-cross points,
    measurement of the second propagation time $t\tau2$ with the high-speed clock starts when the zero-cross point is detected, and ends when the measurement of the first propagation time $t\tau1$ ends, and
    the propagation time $t\tau$ is obtained through formula $t\tau = t\tau1 - t\tau2$.

3. The ultrasonic flowmeter according to claim 1, wherein measurement of the first propagation time $t\tau1a$ with the mid-speed clock starts when the burst waves are transmitted, and ends in any interval before the third comparator detects the zero-cross point,
    measurement of the second propagation time $t\tau2a$ with the high-speed clock starts when the measurement of the first propagation time tτ1a ends, and ends when the zero-cross point is detected, and the propagation time tτ is obtained through formula tτ=tτ1a+tτ2a.

4. The ultrasonic flowmeter according to claim 1, wherein measurement of the first propagation time tτ1a with the mid-speed clock starts when the burst waves are transmitted, and ends in any interval before it is detected by using the second comparator that the amplified signal exceeds the threshold, measurement of the second propagation time tτ2a with the high-speed clock starts when the measurement of the first propagation time tτ1a ends, and ends when the third comparator detects the zero-cross point, and the propagation time tτ is obtained through formula tτ=tτ1a+tτ2a.

5. The ultrasonic flowmeter according to claim 1, wherein measurement of a propagation time tτ is performed in parallel with calibration of the mid-speed clock and calibration of the high-speed clock.

6. The ultrasonic flowmeter according to claim 1, wherein measurement of the propagation time is performed with respect to the amplified signal that has two or more crests as the crest and has four or more zero-cross points as the plurality of zero-cross points.

7. The ultrasonic flowmeter according to claim 1, wherein detection of the zero-cross point by the third comparator is performed after it is detected by using the second comparator that the amplified signal exceeds the threshold.

8. The ultrasonic flowmeter according to claim 1, wherein the amplifier includes
a first amplifier which amplifies the received signal to a predetermined amplitude value, and
a second amplifier which finely adjusts a first amplified signal outputted from the first amplifier to a predetermined level.

9. The ultrasonic flowmeter according to claim 8, wherein the second amplifier is constituted of a programmable gain amplifier (PGA).

10. The ultrasonic flowmeter according to claim 1, wherein calibration of the high-speed clock with the mid-speed clock is started later than the high-speed clock is generated.

11. The ultrasonic flowmeter according to claim 1, wherein a start of calibration of the high-speed clock coincides with a rising edge or a falling edge of the low-speed clock.

12. The ultrasonic flowmeter according to claim 11, wherein a calibration interval for calibrating the high-speed clock includes
a first interval zone set based on a predetermined number of clocks of the mid-speed clock counted from an Nth rising edge or an Nth falling edge of the low-speed clock, N being an integer equal to or greater than one, and
a second interval zone set based on a predetermined number of clocks of the mid-speed clock counted from an (N+1)th rising edge or an (N+1)th falling edge of the low-speed clock.

13. The ultrasonic flowmeter according to claim 12, wherein a time width of a calibration interval for calibrating the mid-speed clock with the low-speed clock is from a falling edge of the first interval zone until a falling edge of the second interval zone.

14. The ultrasonic flowmeter according to claim 13, wherein $T=T1\,T2+T3$ holds, where T1 represents a time width of the first interval zone,
T2 represents a time width of the second interval zone,
T3 represents a time width from the falling edge of the first interval zone until the falling edge of the second interval zone, and
T represents a time width of one period of the low-speed clock.

15. The ultrasonic flowmeter according to claim 13, wherein calibration of the high-speed clock is performed in the time width T1 and in the time width T2, and calibration of the mid-speed clock is performed in the time width T3.

16. The ultrasonic flowmeter according to claim 1, wherein the transmitter, the switch, the amplifier, the first comparator, the second comparator, the third comparator, and a generator that generates the high-speed clock are incorporated in one same semiconductor integrated circuit.

17. The ultrasonic flowmeter according to claim 1, wherein
the low-speed clock is generated by a crystal oscillator,
the high-speed clock is generated by a ring oscillator,
the mid-speed clock is generated by a CR oscillator or a ceramic oscillator,
the crystal oscillator and the ceramic oscillator are disposed outside the semiconductor integrated circuit, and
the CR oscillator and the ring oscillator are incorporated in the semiconductor integrated circuit.

* * * * *